Patented Mar. 1, 1938

2,109,641

UNITED STATES PATENT OFFICE 2,109,641

LOW EXPANSION GLASS COMPOSITION

Harrison P. Hood, Corning, N. Y., assignor to Corning Glass Works, Corning, N. Y., a corporation of New York No Drawing. Application February 19, 1935, Serial No. 7,301

6 Claims. (Cl. 106—36.1)

The increase in the size of mirrors for use in reflecting telescopes has been the subject of much research in past years. It has been recognized that certain characteristics are essential in the material from which the hoped-for larger mirrors should be made, these characteristics including a low thermal expansion, a high surface hardness and high chemical stability. While it has been recognized that certain glasses have these desirable properties and while glass has been used prior to this invention for mirrors in reflecting telescopes, no glass mirror of a diameter greater than 101 inches and a thickness of thirteen inches has been successfully cast and polished, this being of high expansion glass, and its size having been limited by the inherent difficulties in the casting and cooling of such large masses of glass. As a material meeting the requirements, particularly as to low expansion, fused quartz has been suggested and tried and much effort and research has been expended in unsuccessful attempts to fabricate large mirrors of that material. Astronomers, however, have insisted that they be furnished with a better tool and at their demand the problem of supplying larger glass mirrors was taken up by this applicant after the failure of the efforts of others to produce a quartz mirror of suitable size and quality. By the use of the discoveries for which a patent is here sought, it is now possible to cast and anneal a mirror blank 200 inches in diameter of a glass having a thermal coefficient of expansion of $.0_5245$. Such blanks are about 26 inches thick and each blank weighs about 40,000 pounds.

The amount of glass in such a mirror introduces a difficulty, heretofore considered unsurmountable and increasing with the size of the mirror, in that the annealing time increases many fold with the size of the mirror and devitrification becomes a serious hindrance. By "devitrification" is meant the formation of a second solid phase which may or may not be crystalline in a glass consisting initially of one solid phase. In order to afford minimum opportunity for devitrification to occur and also to decrease the fuel and labor cost to the minimum, it is desirable to accomplish the annealing of large glass articles in the shortest possible time. For a given glass the shortest time in which it can be annealed to a predetermined degree of stress will depend entirely upon the thickness of the article and will increase a hundred-fold for a ten-fold increase of the thickness. The maximum degree of stress which is permissible for my purpose should not exceed that which will cause a birefringence of about 20 m$\mu$ per centimeter. Although glasses which have a high alkali content do not, as a rule, devitrify readily at annealing temperatures, I have found that when ordinary low expansion glasses are subjected to the heat treatment which is necessary to anneal, in the shortest possible time, an article thereof having a thickness greater than about six inches, sufficient devitrification occurs to render them unfit for my purpose. For six inch thickness, such article must be maintained for about 255 hours or about ten days at a temperature of about 545° C. after which it is cooled at a predetermined rate. In the case of the above mentioned 200 inch mirror, the cast blank must be maintained for about 1200 hours or about 50 days at an annealing temperature of about 500° C., a condition under which devitrification and lowered stability occurs with many borosilicate glasses. On account of the lowered stability which results from such heat treatments many borosilicate glasses can not thereafter repeatedly be silvered in the manner customarily used in forming astronomical mirrors, because the necessary cleaning with acid and alkali solutions changes the surface of the glass so that the silver does not form a bright metallic mirror thereon but instead produces merely a brown colored coating. One problem, therefore, presented for solution was to find what glass or glasses, if any, having high chemical stability and low expansion, would flow sufficiently freely at the temperature permissible for casting in a mold and would not in cooling, under the conditions imposed by the size of the casting, devitrify during annealing.

I have now discovered that a narrow field of compositions in the ternary system, alkali oxide—boric oxide—silica, having an alkali oxide content from .5% to 2.5% and a silica content from 75% to 87%, not only have unusually low coefficients of expansion but are particularly resistant to the devitrification and loss of stability which normally result from long thermal treatment. These properties of this type of glasses have hitherto not been investigated because it was generally believed that no suitable glass for the purpose had in view could be found within the limits of such field, as it was believed that compositions of such low alkali and high silica contents would undoubtedly possess very high viscosities at normal melting temperatures and would be practically unmeltable by ordinary methods, and, furthermore, might comprise, in the lithia system, unstable glasses which would devitrify easily. Moreover, the prior knowledge of and experience with borosilicate glasses in general gave no indication that the compositions in the narrow field now under consideration would be particularly resistant to changes resulting from long heat treatments.

My researches have shown that the compositions of this limited field are particularly suitable for my purpose, and more especially so if they contain lithia up to the extent of about one-third of the total alkali content and/or if they contain a small amount of fluorine. The introduction of lithia and/or fluorine causes a lowering of the melting temperature of the glass without seriously affecting the resistance to devitrification and the coefficient of expansion.

The following is a batch for a glass which falls within the scope of my invention and which is particularly suitable for my purpose:

| | |
|---|---|
| Sand | 410 |
| Boric acid | 148 |
| Niter | 14 |
| Lithium carbonate | 3.6 |
| Cryolite | 3 |
| Alumina | 6 |
| Arsenic | 5 |

The composition of the glass resulting from the melting of the above recited batch and as calculated from the batch is as follows:

| | Per cent |
|---|---|
| $SiO_2$ | 81.0 |
| $B_2O_3$ | 16.5 |
| $Na_2O$ | 1.3 |
| $Li_2O$ | .3 |
| $Al_2O_3$ | .9 |

The analytical determination of the fluorine in the glass showed that it amounted to about .06%. The expansion coefficient of the above recited glass is $.0_5245$.

The preparation of glass compositions in accordance with my invention is subject to the following considerations: With a silica content less than 85% the alkali content should preferably be not greater than 2% in order to promote maximum stability. Alumina will improve the stability of the glass toward devitrification, but in excessive amount it also raises the melting temperature and causes a marked increase in the difficulty of fining it. Therefore, I prefer to use as a part of the batch only from .5% to 1.0% of alumina.

The above described glasses, when melted in the usual manner and cast to form an article of relatively great thickness, such as a disc for a telescope mirror, will not appreciably devitrify during the most suitable thermal treatment which can be selected for the proper annealing thereof. My improved glasses are particularly useful in making annealed articles, such as telescope mirrors, monuments, and the like, which have a minimum thickness of six inches or more or which require at least 10 days or more of thermal treatment in the annealing range of temperatures.

I claim:

1. A glass containing silica, boric oxide, lithia and at least one other alkali metal oxide, the silica content being between 75% and 87%, the total alkali content being between .5% and 2.5% and the lithia constituting not over one-third of the total alkali content.

2. A glass containing silica, boric oxide, lithia and at least one other alkali metal oxide, the silica content being between 75% and 87%, the total alkali content being between .5% and 2.0% when the silica is below 85% and between .5% and 2.5% when the silica is above 85% and the lithia constituting not over one-third of the total alkali content.

3. A glass containing silica, boric oxide, lithia and at least one other alkali metal oxide, the silica content being between 85% and 87%, the total alkali content being between .5% and 2.5% and the lithia constituting not over one-third of the total alkali content, and containing fluorine.

4. A glass containing silica, boric oxide, lithia and at least one other alkali metal oxide, the silica content being between 75% and 87%, the total alkali content being between .5% and 2.0% when the silica is below 85% and between .5% and 2.5% when the silica is above 85% and the lithia constituting not over one-third of the total alkali content, and containing fluorine.

5. A glass containing approximately 81.0% $SiO_2$, 16.5% $B_2O_3$, 1.3% $Na_2O$, .3% $Li_2O$, .9% $Al_2O_3$ and .06% analytically determined fluorine.

6. A glass containing silica, boric oxide, lithia, at least one other alkali oxide and at least .5% of alumina, the silica content being between 75% and 87%, the total alkali being between .5% and 2.5% and the lithia constituting not over two thirds of the total alkali content.

HARRISON P. HOOD.